(12) United States Patent
Jones et al.

(10) Patent No.: US 6,195,379 B1
(45) Date of Patent: Feb. 27, 2001

(54) LASER ASSEMBLY SYSTEM AND METHOD

(75) Inventors: Benjamin K. Jones; Jeffery A. Broderick; Jason W. Bethel, all of Seattle; Eugene F. Yelden, Mill Creek; Erik R. Stockinger, Lake Forest Park, all of WA (US)

(73) Assignee: Synrad, Inc., Mukilteo, WA (US)

( * ) Notice: Subject to any disclaimer, the term of this patent is extended or adjusted under 35 U.S.C. 154(b) by 0 days.

(21) Appl. No.: 09/472,735

(22) Filed: Dec. 27, 1999

(51) Int. Cl.$^7$ .................................................. H01S 3/097
(52) U.S. Cl. ................................ 372/87; 372/92; 372/64
(58) Field of Search ............................ 372/87, 83, 56, 372/92, 64, 19, 95

(56) References Cited

U.S. PATENT DOCUMENTS

| | | | |
|---|---|---|---|
| 4,129,836 | 12/1978 | Papayoanou | 331/94.5 D |
| 4,433,418 | * 2/1984 | Smith | 372/95 |
| 4,446,558 | 5/1984 | Sepp et al. | 372/64 |
| 4,481,634 | 11/1984 | Grossman et al. | 372/87 |
| 4,500,996 | 2/1985 | Sasnett et al. | 372/19 |
| 4,577,323 | 3/1986 | Newman et al. | 372/64 |
| 4,618,961 | 10/1986 | Sutter, Jr. | 372/87 |
| 4,719,639 | 1/1988 | Tulip | 372/66 |
| 4,759,027 | 7/1988 | Hahn et al. | 372/61 |
| 4,805,182 | 2/1989 | Laakmann | 372/82 |
| 4,837,772 | 6/1989 | Laakmann | 372/82 |
| 4,841,539 | 6/1989 | Hahn et al. | 372/63 |
| 4,939,738 | 7/1990 | Opower | 372/95 |
| 5,008,894 | 4/1991 | Laakmann | 372/38 |
| 5,048,048 | 9/1991 | Nishimae et al. | 372/95 |
| 5,065,405 | 11/1991 | Laakmann et al. | 372/92 |
| 5,123,028 | 6/1992 | Hobart et al. | 372/95 |
| 5,125,001 | * 6/1992 | Yagi et al. | 372/92 |
| 5,131,003 | 7/1992 | Mefferd | 372/65 |

(List continued on next page.)

OTHER PUBLICATIONS

Hall, D.R. and Hill, C.A., *Handbook of Molecular Lasers*, Marcel Dekker, Inc., New York, NY, 1987, Chap. 3, "Radiofrequency–Discharge–Excited $CO_2$ Lasers," pp. 165–258.

(List continued on next page.)

*Primary Examiner*—Leon Scott, Jr.
(74) *Attorney, Agent, or Firm*—Seed IP Law Group PLLC

(57) ABSTRACT

A laser assembly system and method uses an electrode assembly and flexible housing to reduce manufacturing costs and complexity. The flexible housing also helps to insure uniform contact with the housing and electrically insulating material between the housing and electrodes. The uniform contact in turn assists in maintaining a uniform electric field in the discharge area of the laser, which affects laser performance, and assists in maintaining efficient cooling of the electrodes and the lasing medium. The electrode assembly is pre-assembled before insertion into the laser housing, which reduces adverse effects of anomalies of housing construction and helps to reduce the complexity and cost of manufacturing of the laser. The electrode assembly includes first and second electrodes that are separated by spacers made out of an electrically insulating material such as ceramic. The first and second electrodes are rigidly linked together in the electrode assembly by linkages such as including bolts and ceramic bushings. In an unflexed position, top and bottom walls of the housing are slightly bowed toward the center of the housing. The thickness and bow of the top and bottom walls of the housing allow for substantial resilient flexing of the housing under an applied outward force to the top and bottom walls of the housing. The outward flexing of the top and bottom walls of the housing accommodates insertion of the electrode assembly into the housing. After the electrode assembly is inserted into the housing, the applied force to the top and bottom walls of the housing is removed, which allows the top and bottom walls of the housing to supply a clamping force onto the outer surfaces of the electrode assembly due to the bow and resiliency of the top and bottom walls of the housing.

19 Claims, 12 Drawing Sheets

U.S. PATENT DOCUMENTS

| | | | |
|---|---|---|---|
| 5,140,606 | 8/1992 | Yarborough et al. | 372/64 |
| 5,164,952 | 11/1992 | Guenther | 372/61 |
| 5,197,079 | 3/1993 | Krueger et al. | 372/87 |
| 5,220,577 | 6/1993 | Opower | 372/92 |
| 5,231,644 | 7/1993 | Krueger et al. | 372/107 |
| 5,245,625 | 9/1993 | Guenther | 372/82 |
| 5,255,283 * | 10/1993 | Belanger et al. | 372/92 |
| 5,271,029 * | 12/1993 | Seiffarth et al. | 372/64 |
| 5,335,242 | 8/1994 | Hobart et al. | 372/95 |
| 5,353,297 | 10/1994 | Koop et al. | 372/64 |
| 5,392,309 * | 2/1995 | Nishimae et al. | 372/95 |
| 5,412,681 * | 5/1995 | Eisel et al. | 372/64 |
| 5,430,753 | 7/1995 | Welsch et al. | 372/87 |
| 5,600,668 | 2/1997 | Erichsen et al. | 372/87 |
| 5,661,746 | 8/1997 | Sukhman et al. | 372/83 |
| 5,684,822 * | 11/1997 | Partlo | 372/95 |
| 5,748,663 | 5/1998 | Chenausky | 372/64 |
| 5,754,575 | 5/1998 | Sukhman et al. | 372/36 |
| 5,822,354 | 10/1998 | Vitruk | 372/92 |
| 5,881,087 | 3/1999 | Sukhman | 372/61 |
| 5,892,782 * | 4/1999 | Vitruk et al. | 372/64 |
| 5,894,493 | 4/1999 | Sukhman et al. | 372/83 |
| 5,953,360 | 9/1999 | Vitruk et al. | 372/87 |
| 5,982,803 | 11/1999 | Sukhman et al. | 372/87 |

OTHER PUBLICATIONS

Hodgson, N. and Weber, H., *Optical Resonators: Fundamentals, Advanced Concepts and Applications*, Springer–Verlag, London, 1997, Chap. 2, pp. 54–114.

Hodgson, N. and Weber, H., *Optical Resonators: Fundamentals, Advanced Concepts and Applications*, Springer–Verlag, London, 1997, Chap. 5, pp. 165–222.

Oron, R. et al., "Laser Mode Discrimination with Intracavity Spiral Phase Elements," *Opt. Comm.*, 169:115–121, 1999.

Witteman, W.J., *The $CO_2$ Laser*, Springer Series in Optical Sciences; v. 53, Springer–Verlag Berlin Heidelberg, 1987, pp. 170–178.

* cited by examiner

LASER ASSEMBLY SYSTEM AND METHOD

CROSS-REFERENCES TO RELATED APPLICATIONS

The present invention is related to commonly assigned, concurrently filed and co-pending U.S. application Ser. No. 09/472,731 for "LASER WITH SIMPLIFIED RESONATOR FOR PRODUCING HIGH QUALITY LASER BEAMS"; Ser. No. 09/472,726 for "LASER WITh HEAT TRANSFER SYSTEM AND METHOD"; and Ser. No. 09/472,733 for "LASER SYSTEM AND METHOD FOR BEAM ENHANCEMENT." All of the above U.S. applications are incorporated by reference.

TECHNICAL FIELD

The present invention relates generally to systems and methods for assembly of lasers, and more particularly, to assembly of lasers with electrodes such as used in gas lasers.

BACKGROUND OF THE INVENTION

Conventional gas lasers have many components including such things as electrodes, inductors, ground spacers, and alignment screws, that must be precisely positioned, fitted, and aligned under highly demanding tolerances within a gas laser housing as part of the assembly process. Unfortunately, the methods and construction of conventional gas lasers require much time, effort, and expense.

In addition, performance and quality regarding such things as inter-electrode gap and cooling efficiency of the assembled gas lasers can vary widely among individual gas lasers of the same construction due to the demanding tolerances and difficult assembly procedures. Furthermore, imperfections such as bowing, twisting, or other dimensional anomalies in the gas laser housing itself result from the extrusion, casting, machining, and other manufacturing processes used in the manufacturing of the housing and can adversely impact the quality of the laser bore itself, adversely impact uniformity of the electric field within the discharge area of the gas laser, and also degrade cooling efficiencies thereby further adversely impacting laser performance. These adverse effects can result in poor beam quality and poor beam power levels of conventional gas lasers even when costly and time consuming assembly procedures are implemented.

SUMMARY OF THE INVENTION

A laser assembly system and method has aspects including a housing and an electrode assembly. The housing has a first wall with a first interior surface and an opposing second wall with a second interior surface. The electrode assembly has first and second electrodes each having an interior surface and an exterior surface. The electrode assembly also has linkage members configured to rigidly link the first and second electrodes together independent of the housing. One or more portions of first electrical insulation material are positioned adjacent to and extending outward of the exterior surface of the first electrode. One or more portions of second electrical insulation material are positioned adjacent to and extending outward of the exterior surface of the second electrode. One or more portions of third electrical insulation material are positioned between the first and second electrodes to separate the interior surfaces of the first and second electrodes from one another to form an inter-electrode gap between the interior surfaces of the first and second electrodes.

Further aspects include the first and second walls of the housing being resiliently flexed to produce inwardly directed force against the electrode assembly, the first interior surface of the first wall of the housing being in contact with and transmitting force against the one or more portions of the first electrical insulation material, and the second interior surface of the second wall of the housing being in contact with and transmitting force against the one or more portions of the second electrical insulation material. Additional aspects include the first and second electrodes being made from one or more of the following materials: machined metal, extruded metal, and cast metal. Other aspects include a gas medium being made from one or more of the following gases: carbon dioxide, nitrogen, helium, xenon, oxygen, carbon monoxide, hydrogen, water, neon, krypton, and argon.

DETAILED DESCRIPTION OF THE INVENTION

Figure 1:
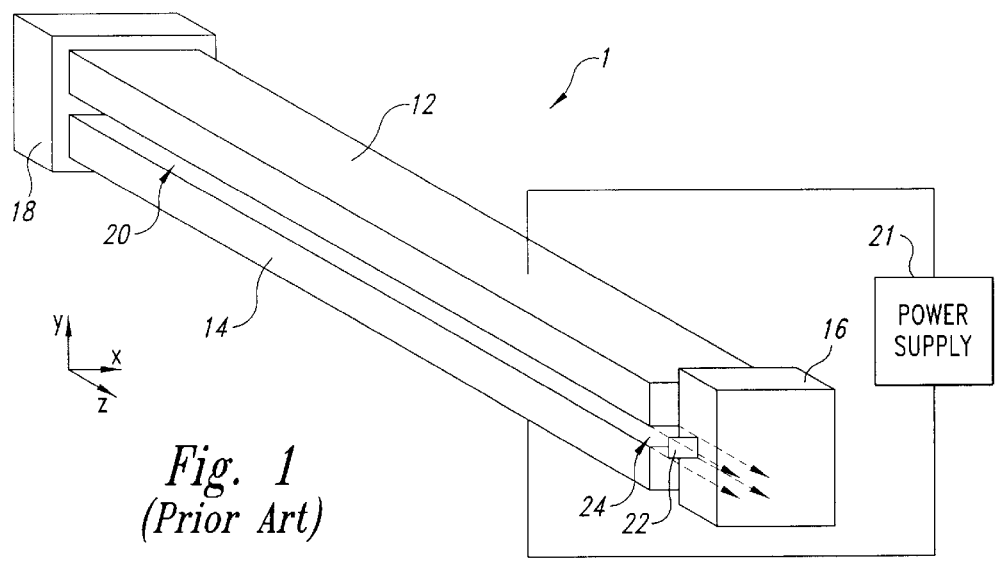
FIG. 1 is an isometric schematic drawing of a slab laser utilizing an embodiment of the present invention.

As shown in the drawings for purposes of illustration, the present invention is embodied in a narrow gap, or slab, gas laser with cooling system, sharing some aspects in common with the conventional slab laser generally indicated by reference 1 in FIG. 1. The conventional slab laser 1 includes first and second elongated planar slab electrodes 12 and 14 parallel to each other and extending between a front resonator mirror 16 and a rear resonator mirror 18. For the depicted embodiment, the slab electrodes 12 and 14 are 50 mm in total width along the transverse x-axis, are 50 cm in total length along the longitudinal z-axis, and have approximately a 4.5 mm inter-electrode gap along the y-axis.

A gas lasing medium is positioned within an optical resonator cavity 20 formed between the resonator mirrors 16 and 18. The front and rear mirrors 16 and 18 are concave-concave optical elements with respect to the x-axis that form a negative branch unstable resonator and are piano-concave optical elements with respect to the y-axis that form a stable resonator. The radii of curvature with respect to the x-axis are 499 mm and 554 mm, and with respect to the y-axis are infinite and 3000 mm for the front and rear mirrors 16 and 18, respectively. With respect to both the x-axis and the y-axis, the optical path length is 526 mm.

Figure 2:
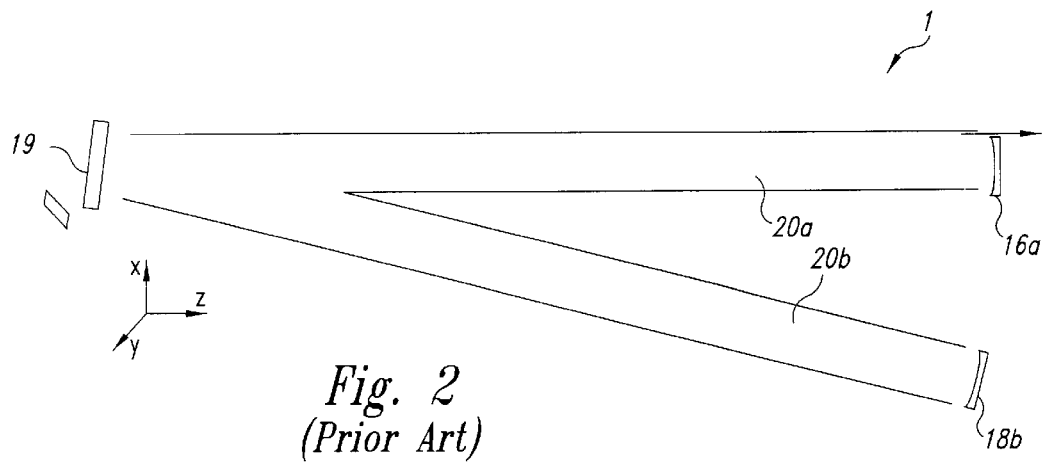
FIG. 2 is a schematic drawing of a slab laser utilizing a folded resonator embodiment of the present invention.
Figure 3:
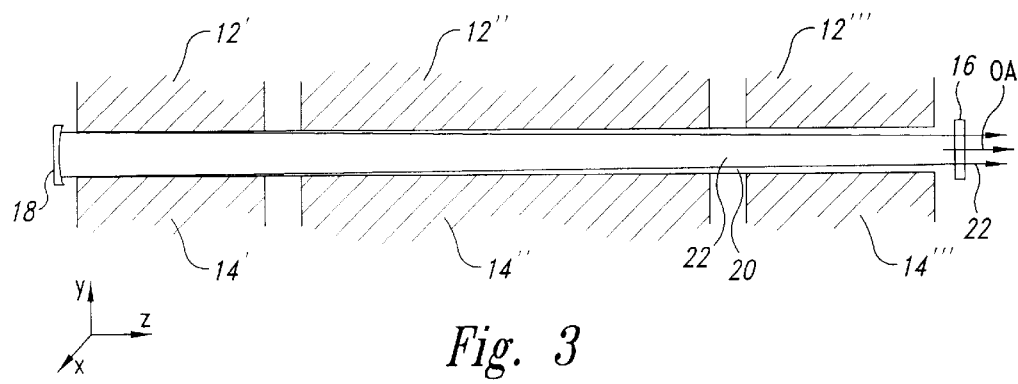
FIG. 3 is a longitudinal cross-sectional view of an alternative embodiment of the present invention illustrating use of multiple sets of electrode pairs.
Figure 4:
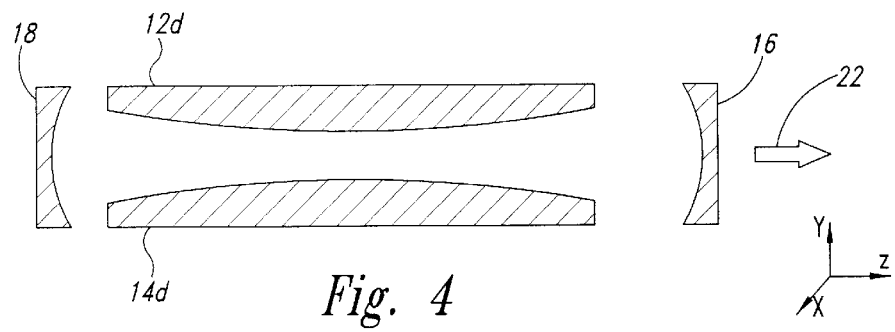
FIG. 4 is a longitudinal cross-sectional view of an alternative embodiment of the present invention illustrating use of contoured electrodes.
Figure 5:
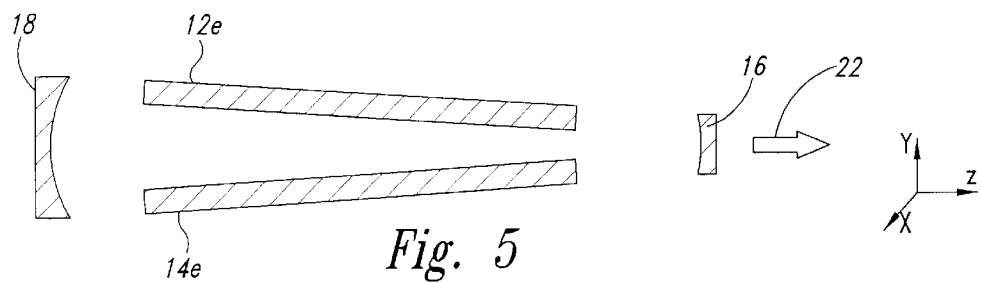
FIG. 5 is a longitudinal cross-sectional view of an alternative embodiment of the present invention illustrating use of tapered electrodes.
Figure 6:
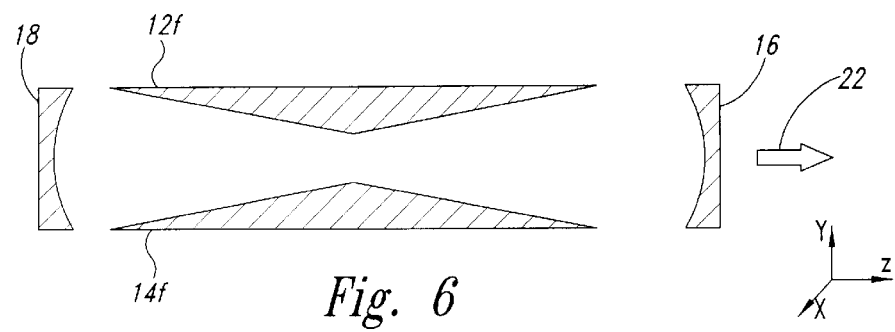
FIG. 6 is a longitudinal cross-sectional view of an alternative embodiment of the present invention illustrating use of triangularly tapered electrodes.
Figure 9:
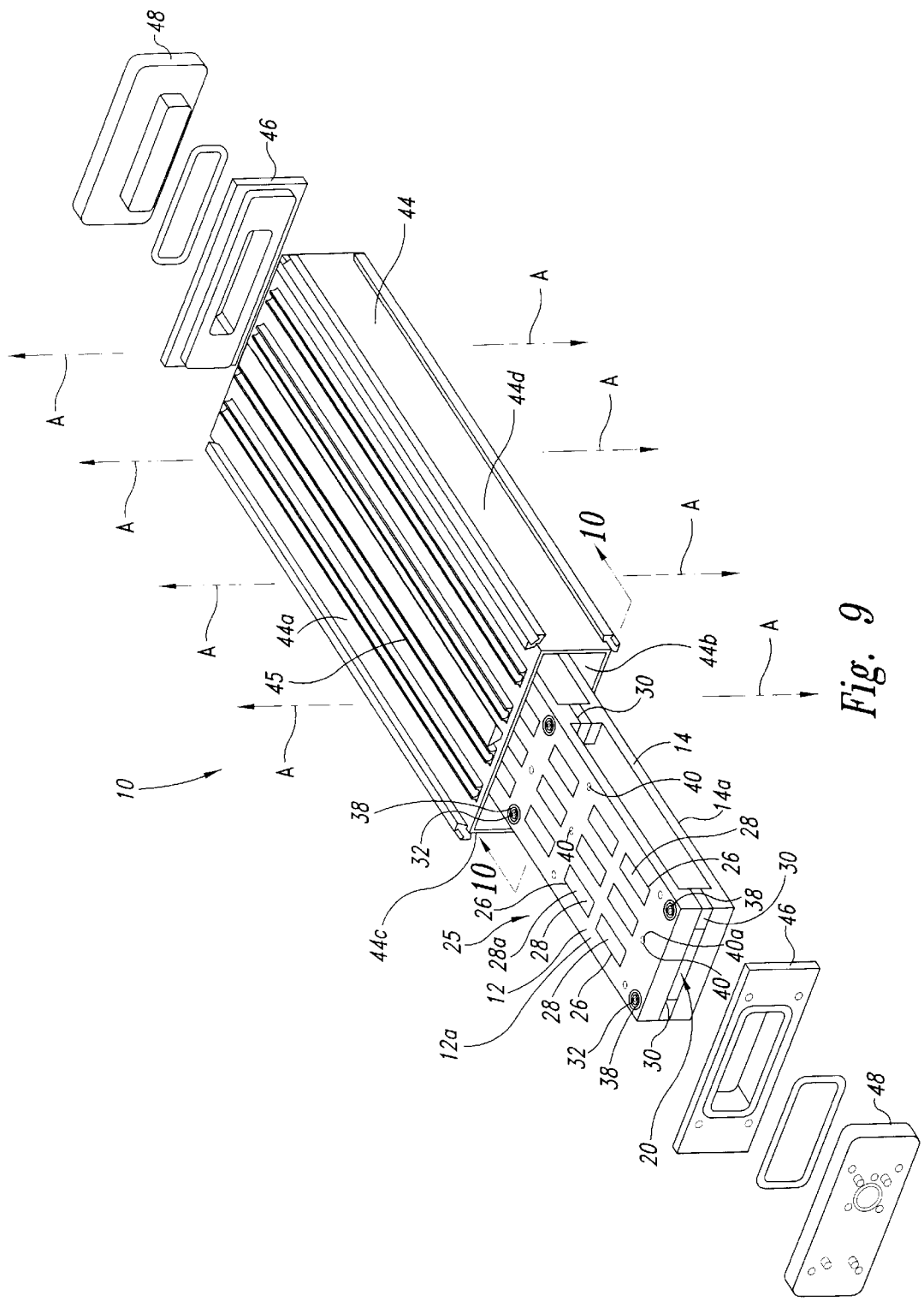
FIG. 9 is an exploded isometric diagram illustrating the assembly details of the depicted embodiment of the present invention.
Figure 10:
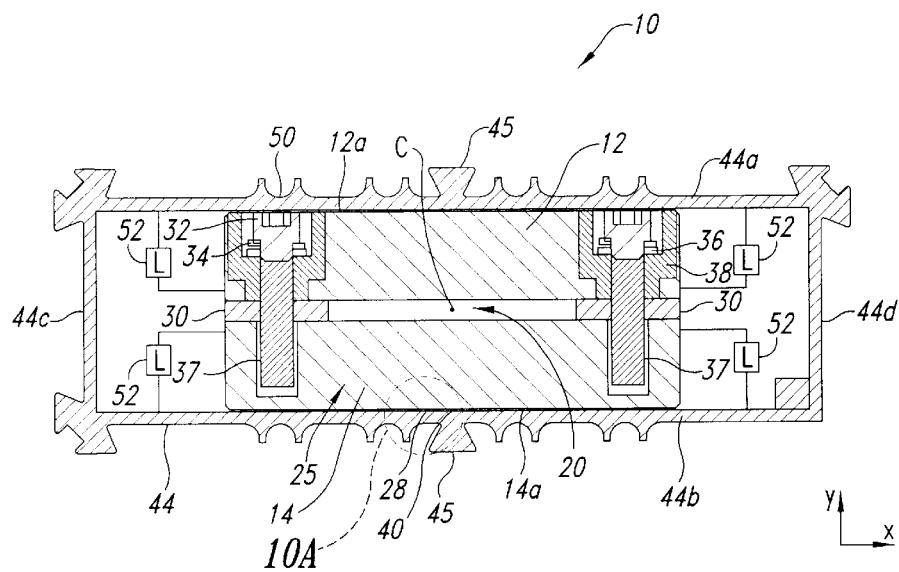
FIG. 10 is an enlarged transverse cross-sectional view of the assembled laser taken substantially along the line 10—10 of FIG. 9 with alternative inductors used.
Figure 10A:
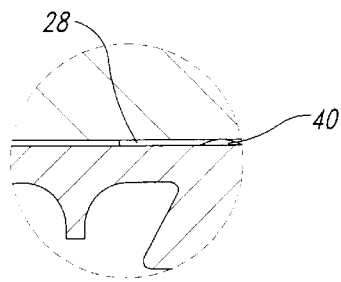
FIG. 10A is a detailed view of a portion of FIG. 10 including a thermal strip and a ceramic pill. cooling

The resonator cavity 20 serves as a discharge area for the gas lasing medium. In the depicted embodiment, the resonator cavity is rectangularly shaped, however, alternative embodiments have square, annular, or other shaped resonator cavities, such as folded resonator cavities. A slab laser 10 according to the present invention (such as shown in FIGS. 9 and 10) can have a folded resonator in some embodiments that are similar in some aspects to the conventional folded resonator shown in FIG. 2, which in this case has a flat mirror 19 positioned between the front and rear mirrors 16a and 18b. Typical with folded cavities, there are multiple resonator sections 20a and 20b, as shown in FIG. 2. Some of the reference numbers in the detailed description are used for parts of both the conventional slab laser 1 and the slab laser according to the present invention 10. For instance, both the slab laser 1 and the slab laser 10 have first and second electrodes 12 and 14, however, as evident from the discussion below, the first and second electrodes 12 and 14 of the inventive slab laser 10 may not share all its aspects with conventional electrodes. Other embodiments have other configurations of mirrors and resonator cavities, including more than two resonator sections. For instance, some embodiments use more than one set of electrodes with more than one associated discharge space such as those sets of electrodes shown in FIG. 3 having pairs of first and second electrodes 12', 14', and 12", 14" and 12''', 14''', respectively. Other embodiments utilize contoured first and second electrodes 12d and 14d that are non-planar with respect to at least one dimension, for instance the longitudinal z-axis, as shown in FIG. 4. Further embodiments use inclined, diverging, or converging with respect to the longitudinal z-axis or tapered first and second electrodes that are planar, but are not parallel with the longitudinal z-axis such as first and second electrodes 12e and 14e of FIG. 5 and triangularly tapered first and second electrodes 12f and 14f of FIG. 6. Other configurations for electrodes are used as well.

For the depicted embodiment, the gas lasing medium is a standard mixture of one part carbon dioxide ($CO_2$), one part nitrogen ($N_2$), and three parts helium (He), with the addition of 5% xenon (Xe) at a pressure of 50 Torr. Other embodiments use other gas mixtures, or their isotopes, including portions of neon (Ne), carbon monoxide (CO), hydrogen ($H_2$), water ($H_2O$), krypton (Kr), argon (Ar), fluorine (F), deuterium, or oxygen ($O_2$) and other gases at various other gas pressures such as ranging from 30 to 120 Torr including 50 Torr; however, it will be appreciated that other gaseous lasing medium could also be employed. For instance, an alternative embodiment lasing medium could comprise one or more of the following vapors: copper, gold, strontium, barium, a halide compound of copper, a halide compound of gold, a halide compound of strontium, and a halide compound of barium.

The slab laser 10 also includes a power supply 21 (FIG. 1) that applies excitation energy to the gas lasing medium, which causes the lasing medium to emit laser energy. The excitation energy supplied by the power supply 21 in the depicted embodiment has an associated RF voltage, but may also be associated with microwave, pulsed, continuous wave, direct current, or any other energy source that stimulates the lasing medium into producing laser energy. Alternative embodiments utilize other forms of excitation including optically pumped solid-state lasers or use energy sources based upon solar energy, nuclear energy, or chemical energy. When the RF voltage is applied to the gas lasing medium via the slab electrodes 12 and 14, a gas discharge forms within the resonator cavity 20 between the front and rear mirrors 16 and 18. The front and rear mirrors 16 and 18 form the laser energy into a laser beam 22 that travels back and forth in a longitudinal direction along a z-axis as shown in FIG. 1.

In the slab laser 10, the front and rear mirrors 16 and 18 are shaped and positioned to form an unstable resonator along the x-axis of FIG. 1 with an exit aperture 24 such that the laser beam 22 travels laterally until the laser beam exits the resonator cavity 20 via the exit aperture. The slab laser 10 has what is referred to as an unstable resonator even though its resonator is stable along the y-axis of FIG. 1 since its resonator is unstable along the x-axis. This slab laser 10 is alternatively referred to as a hybrid stable-unstable resonator since it is stable with respect to one axis and unstable with respect to another axis. The slab electrodes 12 and 14 are positioned sufficiently far from each other so that the resonator cavity 20 acts as a free-space resonator along the y-axis with a Fresnel number of approximately 0.9 in the depicted embodiment. The slab electrodes 12 and 14 are sufficiently wide and the resonator cavity 20 has little if any sidewalls so that the laser beam 22 has free space propagation with respect to the x-axis as well. Other embodiments use free-space resonators of other Fresnel numbers. Since the resonator cavity 20 acts as a free-space resonator, no special polishing of the slab electrodes 12 and 14 is required in the manufacturing process. Other embodiments include waveguide resonators and non-hybrid stable or unstable resonators.

The laser beam 22 produced by the slab laser 10 exits the resonator cavity 20 via the exit aperture 24, as shown in FIG. 1. Ten percent of the light within the resonator cavity 20 goes through the exit aperture 24 by passing unencumbered beyond an edge of the front mirror 16. In the depicted embodiment, the front and rear mirrors 16 and 18 have opposing concave reflective surfaces. The front and rear mirrors 16 and 18 are also confocal, i.e., have a common focal point. The exit aperture 24 is formed between the slab electrodes 12 and 14 by extending the rear mirror 18 beyond an edge of the front mirror 16 (along the x-axis of FIG. 1) so that the laser beam 22 is reflected by the rear mirror 18 out of the resonator cavity 20 through the exit aperture 24. The front mirror 16 and rear mirror 18 in the depicted embodiment are totally reflecting, but in other embodiments the mirrors are partially reflecting.

Figure 7:
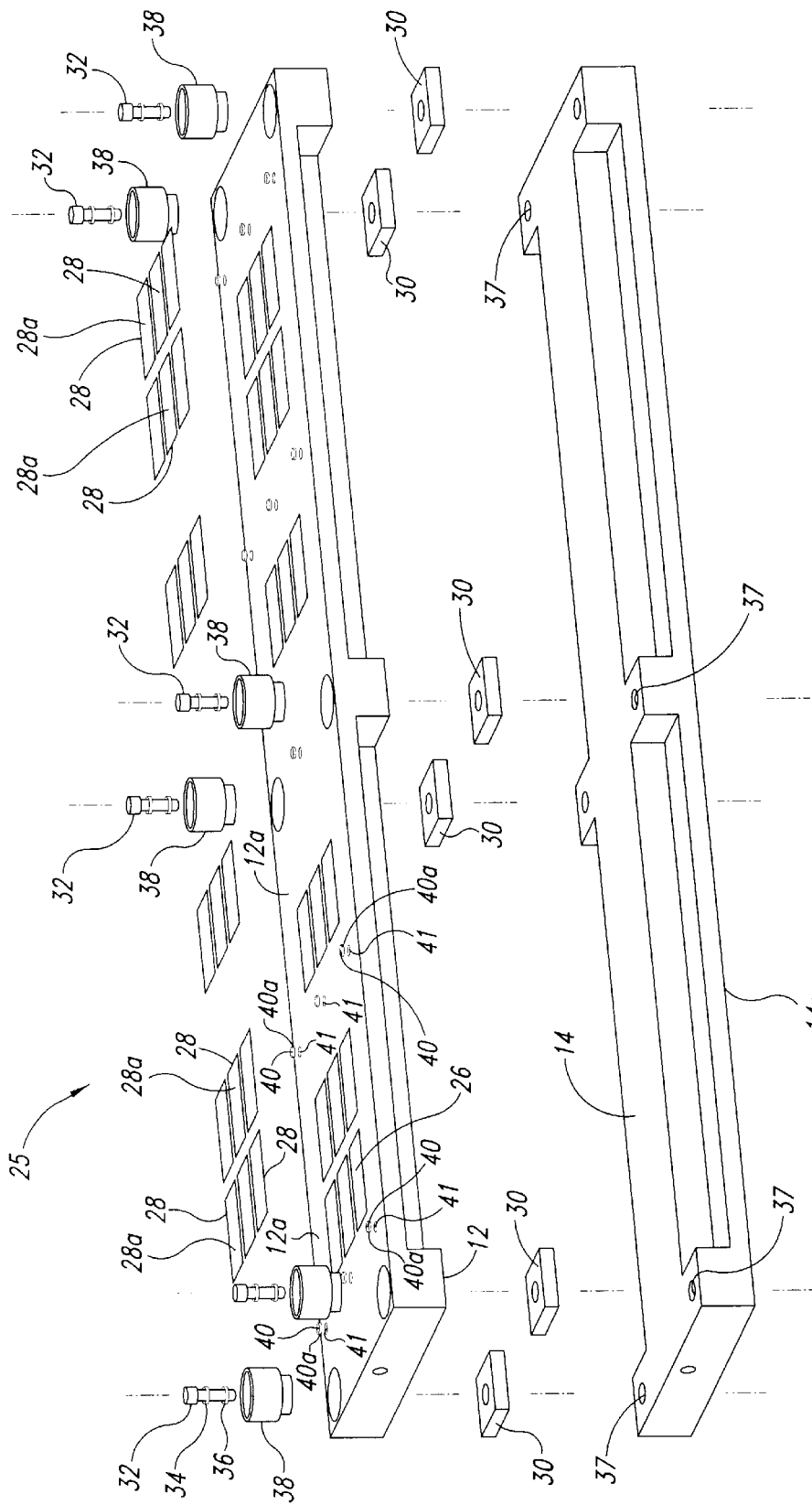
FIG. 7 is an enlarged, exploded isometric diagram illustrating the electrode assembly of the depicted embodiment of FIG. 1.
Figure 8:
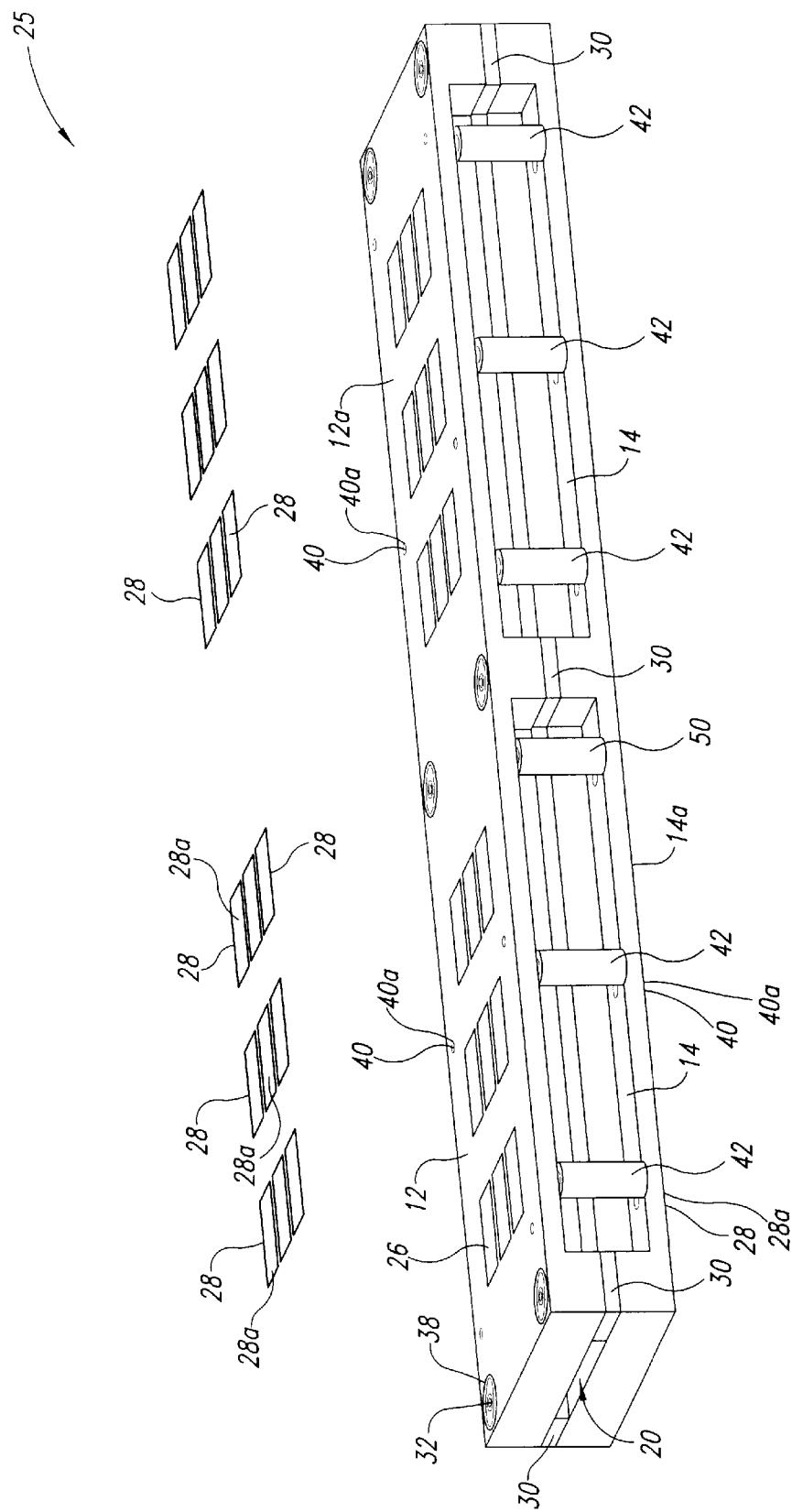
FIG. 8 is an isometric diagram illustrating the electrode assembly of FIG. 7 using inductors.

The first and second slab electrodes 12 and 14 are shown in a more detail in FIGS. 7 and 8 as part of an electrode assembly 25. The electrode assembly 25 includes depressions 26 in an exterior outer wall surface 12a of the first electrode 12 and in an exterior outer wall surface 14a of the second electrode 14 sized and shaped to receive thermal strips 28. The depressions and thermal strips for the outer wall surface 14a of the second electrode 14 are not shown but are substantially identical to those for the first electrode 12. In other embodiments, one or more aspects of the thermal material used for the first electrode 12 differs from one or more aspects of the thermal material used for the second electrode 14 with those aspects including but not limited to size, shape, type, and number of strips or pieces used. In the depicted embodiment, the thermal strips 28 are made of 1 mm thick alumina ($Al_2O_3$) ceramic of approximately 96% purity. The thermal strips 28 electrically insulate the first and second electrodes 12 and 14 from a housing 44 within which the electrode assembly 25 is positioned on assembly of the laser 10, best shown in FIGS. 9 and 10. The thermal strips 28 thermally conduct heat to the housing 44 for cooling of the laser by having external surfaces 28a of the thermal strips 28 in contact with the housing. The housing 44 of the depicted embodiment is of vacuum type to contain the gas lasing medium and to fully enclose the discharge area of the resonator cavity 20.

The housing 44 in the depicted embodiment has a rectangular transverse cross-sectional profile; however, housings of other embodiments have other transverse cross-sectional profiles including square, annular, and other profiles. Other embodiments use an unsealed housing that allows for a slow flow of purge gas to circulate into and out of the housing, but does not significantly contribute any cooling effects to the first and second electrodes 12 and 14. Still other embodiments use other types of ceramic, dielectric material, or other electrically insulating material for the thermal strips 28 which is also a thermally conductive material positioned adjacent to the outer wall surfaces 12a and 14a of the first and second electrodes 12 and 14. For instance, the following can be used either alone or in various combinations with each other: alumina, beryllia, boron nitride, aluminum nitride, mica, polyimide or other electrically insulating materials having thermally conductive and dielectric properties. For gas lasers of some embodiments, the thermal conducting materials are selected with a thermal conductivity greater than the thermal conductivity of the lasing gas medium used in the lasers. These thermal materials can be formed in various shapes other than flat strips positioned adjacent to the first and second electrodes 12 and 14 and adjacent to the housing 44 by either being press fitted into the depressions 26 as is done in the depicted embodiment or by other methods such as coating and bonding methods, e.g., using flame or plasma spraying or anodizing or other methods known in the art. The coating and bonding methods include coating and bonding either portions of the exterior outer wall surfaces 12a and 14a of the first and second electrodes 12 and 14, respectively, or coating and bonding portions of the interior surfaces of the housing 44 adjacent these exterior outer wall surfaces of the electrodes, or coating and bonding a combination of portions of both interior housing and exterior electrode wall surfaces.

In the depicted embodiment, the electrode assembly 25 further includes ceramic spacers 30 to provide gaps between the first and second electrodes 12 and 14. Other embodiments use other ways to support the first and second electrodes 12 and 14 to maintain gaps between the electrodes. The first and second electrodes 12 and 14 are fastened together with the ceramic spacers 30 therebetween using linkage members such as bolts 32, lock washers 34, and flat washers 36 as best shown in FIG. 10. The bolts 32 are threadably received in threaded apertures 37 in the second electrode 14 to rigidly link the first electrode 12 with the second electrode. Other embodiments use other members such as devices and/or materials to rigidly link the first and second electrodes 12 and 14 together. The bolts and washers 32, 34, and 36 are positioned within ceramic bushings 38 to insulate the first electrode 12 from the second electrode 14.

The first and second electrodes 12 and 14 further include ceramic pills 40 received in rows of recesses 41 formed in the outer wall surface 12a of the first electrode 12 and formed in the outer wall surface 14a of the second electrode 14 to provide physical separation of the first and second electrodes 12 and 14 from the housing 44 with external surfaces 40a of the ceramic pills 40 being in contact with the housing. The ceramic pills 40 and recesses 41 of the second electrode are not shown in the drawings but are substantially identical to those for the first electrode 12. The first and second electrodes 12 and 14 can be fabricated from one or a combination of aluminum, copper, brass, stainless steel, gold, silver, platinum or other suitable metals or compounds. The housing 44 in the depicted embodiment is formed by extrusion from a heat conductive aluminum metal alloy, but in other embodiments the housing can be made from other materials to provide vacuum integrity and shielding from RF radiation such as copper, or stainless steel or by other processes such as casting or machining.

The slab laser 10 in the depicted embodiment, best illustrated in FIG. 9, includes two end caps 46 positioned at the opposing ends of the housing 44, and two optic assemblies 48 positioned at the opposing ends of the housing, outward of the corresponding end cap. The end caps 46, in the depicted embodiment, are welded to the housing 44, but in other embodiments the end caps are attached to the housing other ways such as being soldered, epoxied, glued, bolted, or screwed. The laser 10 is assembled by placing the electrode assembly 25 inside of the housing 44 as shown in FIG. 10, by expanding the housing in the direction shown by arrows "A" in FIG. 9. The housing 44 has sufficiently flexible and resilient top and bottom walls 44a and 44b to allow them to be pulled apart sufficiently from an unflexed position to a first flexed position for insertion of the electrode assembly 25 therebetween and then to allow them to move back toward a less flexed second position engaging the electrode assembly and clamping the electrode assembly within the housing. The housing 44 has extended longitudinal ridges 45 integral with the top and bottom walls 44a and 44b of the housing to allow a mechanism (not shown) to clamp on to the longitudinal ridges to apply the outward force necessary to expand the top and bottom walls of the housing. In the depicted embodiment, the top and bottom walls 44a and 44b of the housing 44 are so formed to provide substantially uniform contact, along the transverse x-axis, with the thermal strips 28 and the ceramic pills 40 when in the second flexed position.

Figure 11A:
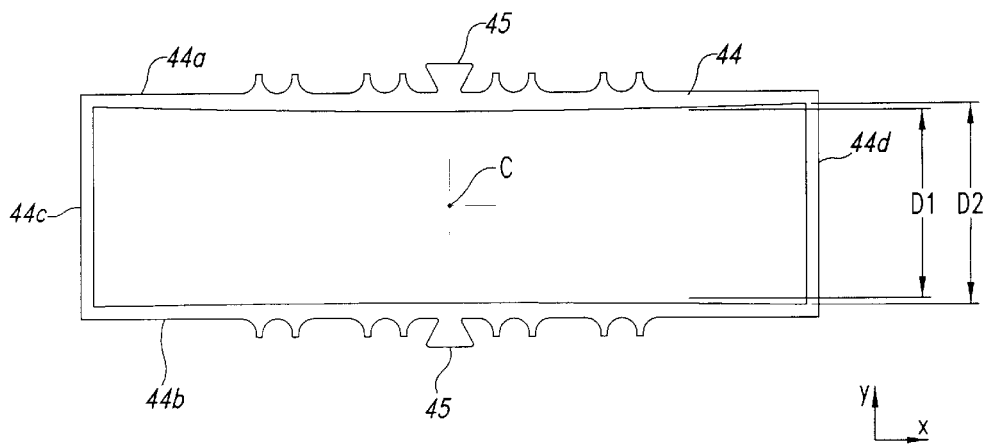
FIG. 11A is a transverse cross-sectional view showing bowing of top and bottom walls of the housing of the laser of FIG. 10.

As best shown in FIG. 11A, when in the unflexed position the top and bottom walls 44a and 44b of the housing 44 are slightly bowed inward toward a center indicated by letter, "C," of the housing in the direction of the transverse y-axis. For the housing 44 in the unflexed position of the depicted embodiment, the distance, D1, between the top and bottom walls 44a and 44b of the housing 44 at the center, C, of the housing is 1.671 inches, plus/minus 0.030 inches, whereas the distance, D2, that the first and second sidewalls 44c and 44d span between the top and bottom walls is 1.757 inches, plus/minus 0.016 inches.

Figure 11B:
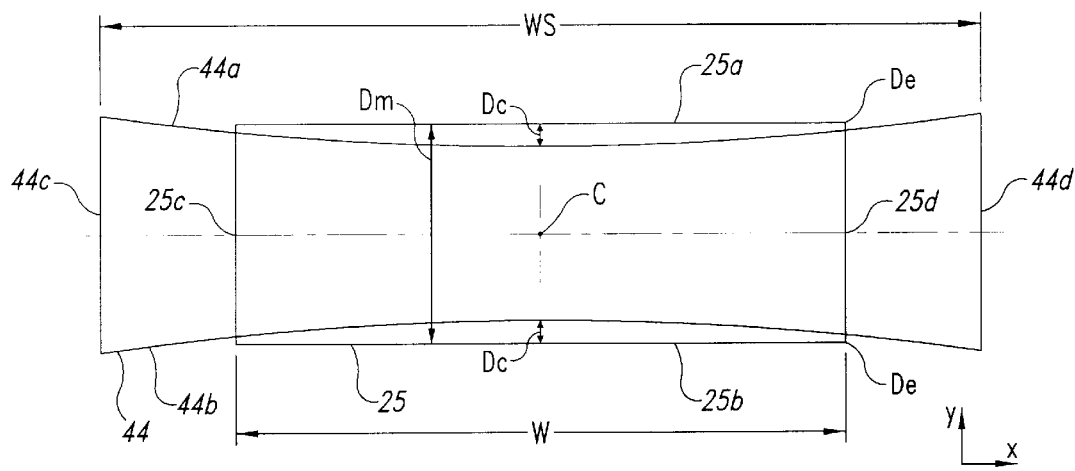
FIG. 11B is an exaggerated simplified transverse profile of the housing of FIG. 11A overlaid upon a simplified transverse profile of the electrode assembly of FIG. 8.

An exaggerated simplified transverse cross-sectional profile of the housing 44 in the unflexed position overlaid upon a simplified transverse cross-sectional profile of the electrode assembly 25 taken along a plane parallel to the x-axis and y-axis is illustrated in FIG. 11B to compare their dimensions. Top and bottom external surfaces 25a and 25b of the electrode assembly 25 are defined by the external surfaces 28a of the thermal strips 28 and/or the external surfaces 40a of the ceramic pills 40 located adjacent to the outer wall surfaces 12a and 14a of the first and second electrodes 12 and 14, as shown in FIGS. 8 and 9. Referring to FIG. 11B, the maximum distance, Dm, between the top and bottom external surfaces 25a and 25b of the electrode assembly 25 is the distance between the external surfaces 28a of pairs of the thermal strips 28 and/or the external surfaces 40a of pairs of the ceramic pills 40 located at corresponding positions on opposing sides of the outer wall surfaces 12a and 14a of the first and second electrodes 12 and 14.

In the depicted embodiment, in the unflexed position, the interior surfaces of the top and bottom walls 44a and 44b of the housing 44 at the center, C, of the housing are closer together by two times Dc (Dc being 0.010 to 0.050 inches in the depicted embodiment) than the maximum distance, Dm, between top and bottom external surfaces 25a and 25b of the electrode assembly 25. The interior surfaces of the top and bottom walls 44a and 44b of the housing 44 at first and second sidewalls 25c and 25d of the electrode assembly 25 are closer together by two times De (De being 0.003 to 0.040 inches in the depicted embodiment) than the maximum distance, Dm, between the top and bottom external surfaces 25a and 25b of the electrode assembly 25. In the depicted embodiment, the width, W, along the x-axis of the electrode assembly 25 is 3.7 inches and the distance between the outer wall surfaces 12a and 14a of the first and second electrodes 12 and 14 is 1.731 inches. The housing 44 is an aluminum extrusion with the top and bottom walls 44a and 44b of the housing in the depicted embodiment having an undeformed wall thickness of 0.093 inches and an undeformed wall span, WS, of 6.0 inches.

Figure 12:
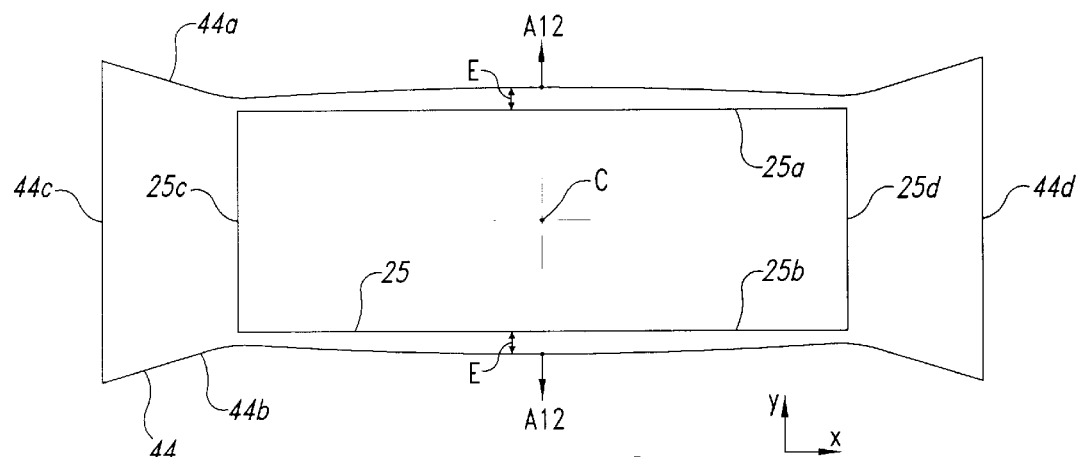
FIG. 12 is the transverse profile of the housing overlaid upon the transverse profile of the electrode assembly shown in FIG. 11B showing the housing in a fully expanded position.

To allow for insertion of the electrode assembly 25 into the housing 44, the top and bottom walls 44a and 44b of the housing are pulled farther apart in the direction of the arrow A12, from the unflexed position of FIG. 11B, another 0.14 inches in the depicted embodiment, into the first flexed position shown in FIG. 12. The first flexed position allows for a clearance, E, of at least 0.010 inches in the depicted embodiment, between the top and bottom external surfaces 25a and 25b of the electrode assembly 25 and the interior surfaces of the top and bottom walls 44a and 44b of the housing 44 all along the transverse x-axis whereas other embodiments allow for a clearance, E, of at least 0.005 inches.

Once the electrode assembly 25 is fully inserted inside the housing 44, the top and bottom walls 44a and 44b of the housing are released and allowed to relax first into a third position with initial contact of the top and bottom walls of the housing being made with the top and bottom external surfaces 25a and 25b of the electrode assembly at the first and second sidewalls 25c and 25d of the electrode assembly. In this third position, at a transverse center, G, a clearance, I, exists between the top external surface 25a of the electrode assembly 25 and the interior surface of the top wall 44a of the housing, and the clearance, I, also exists between the bottom external surface 25b of the electrode assembly and the interior surface of the bottom wall 44b of the housing. The clearance, I, in the depicted embodiment is less than or equal to 0.007 inches.

Figure 13:
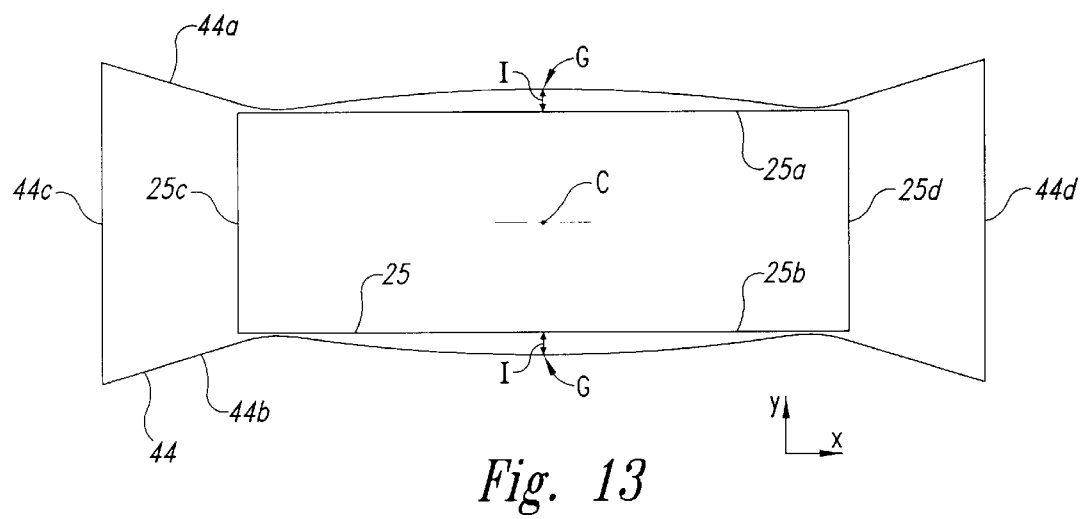
FIG. 13 is the transverse profile of the housing overlaid upon the transverse profile of the electrode assembly shown in FIG. 11B showing the housing in an initial relaxed position.
Figure 14:
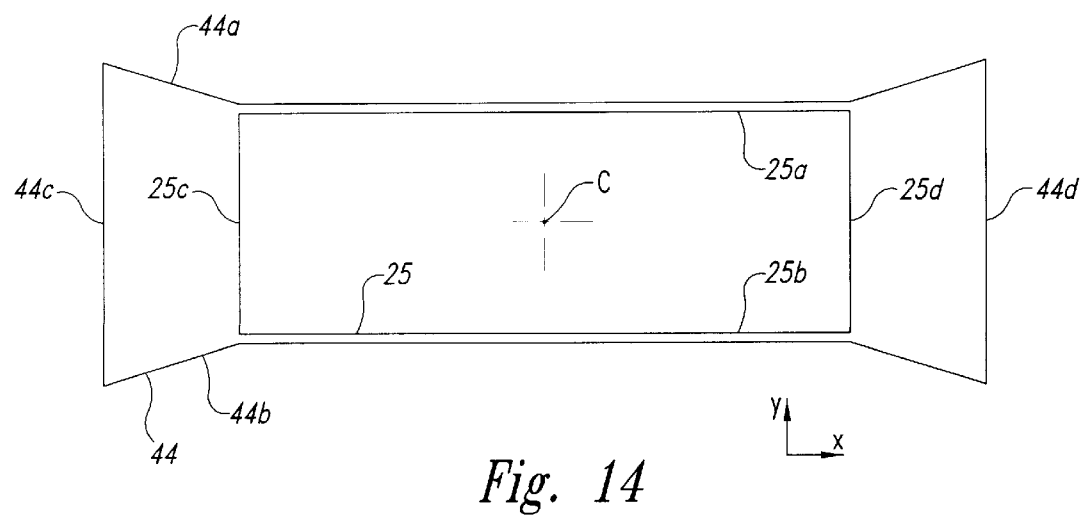
FIG. 14 is the transverse profile of the housing overlaid upon the transverse profile of the electrode assembly shown in FIG. 11B showing the housing in the final relaxed position.
Figure 15A:
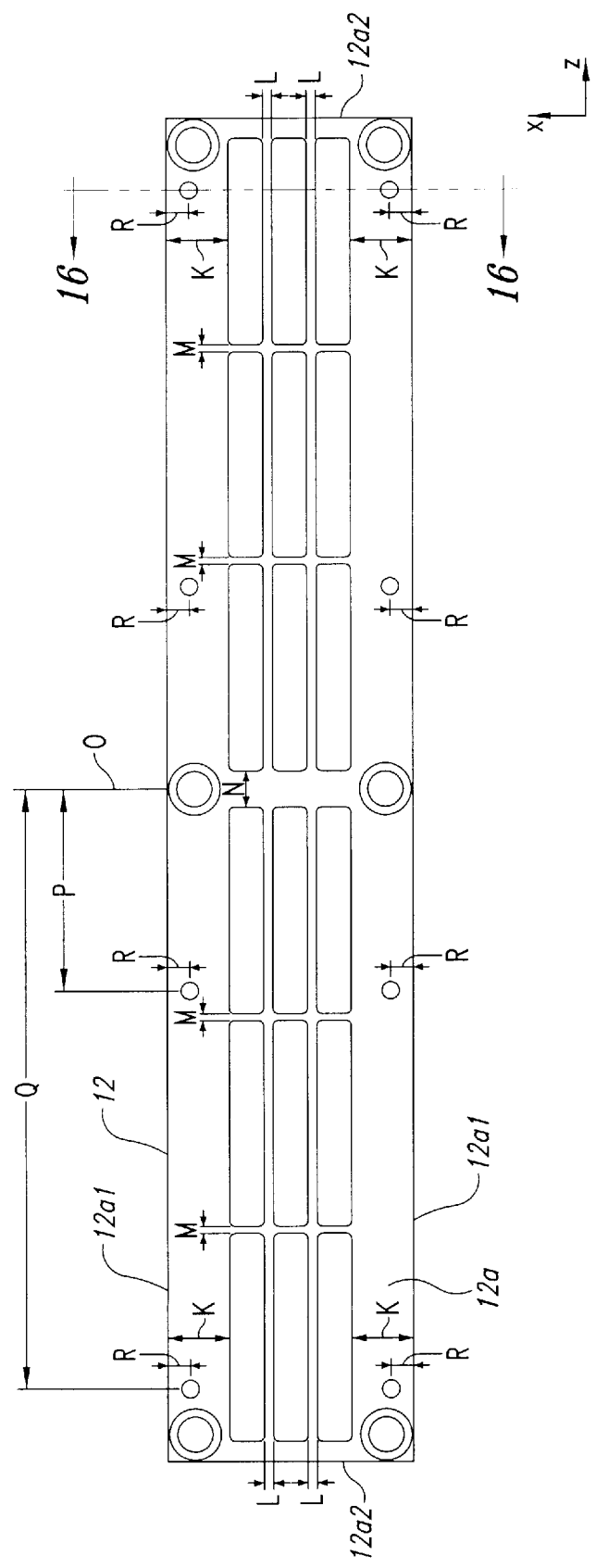
FIG. 15A is a top view of the first electrode of the electrode assembly of FIG. 8 showing thermal strip and ceramic pill placement of an alternative embodiment.
Figure 15B:
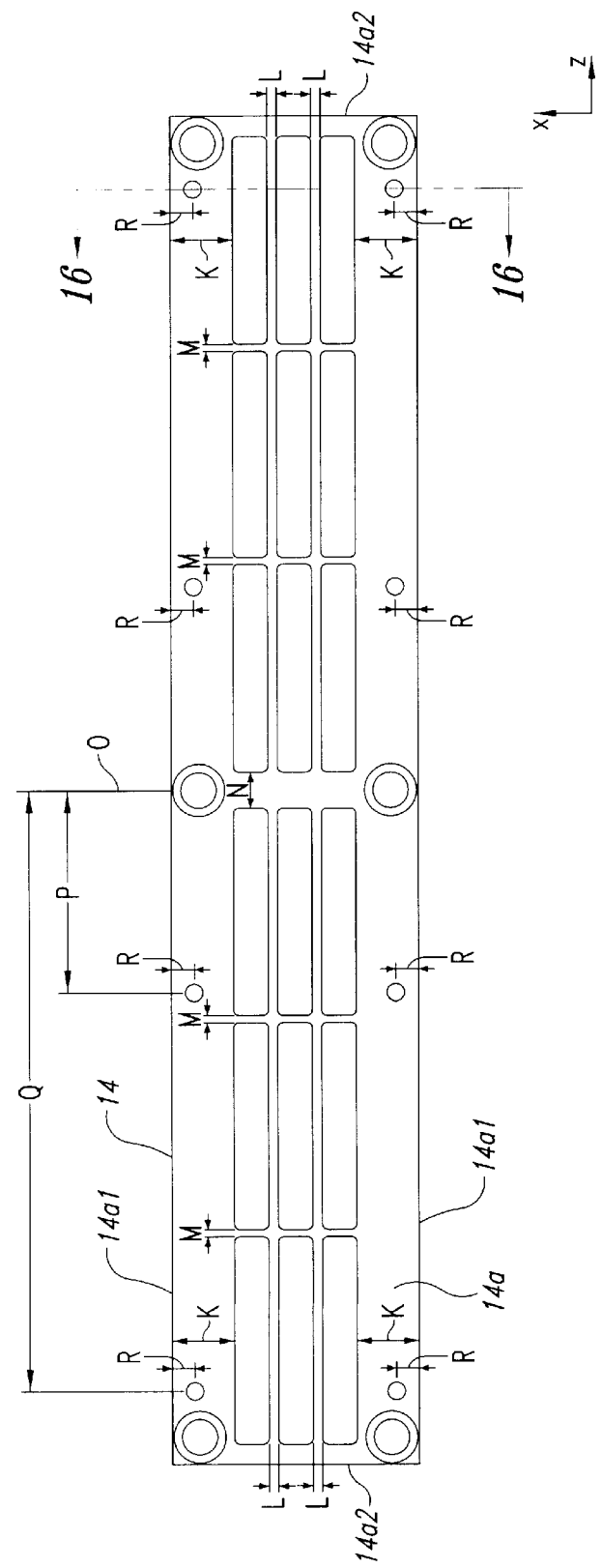
FIG. 15B is a bottom view of the second electrode of the electrode assembly of FIG. 8 showing thermal strip and ceramic pill placement of the alternative embodiment of FIG. 15A.
Figure 16:
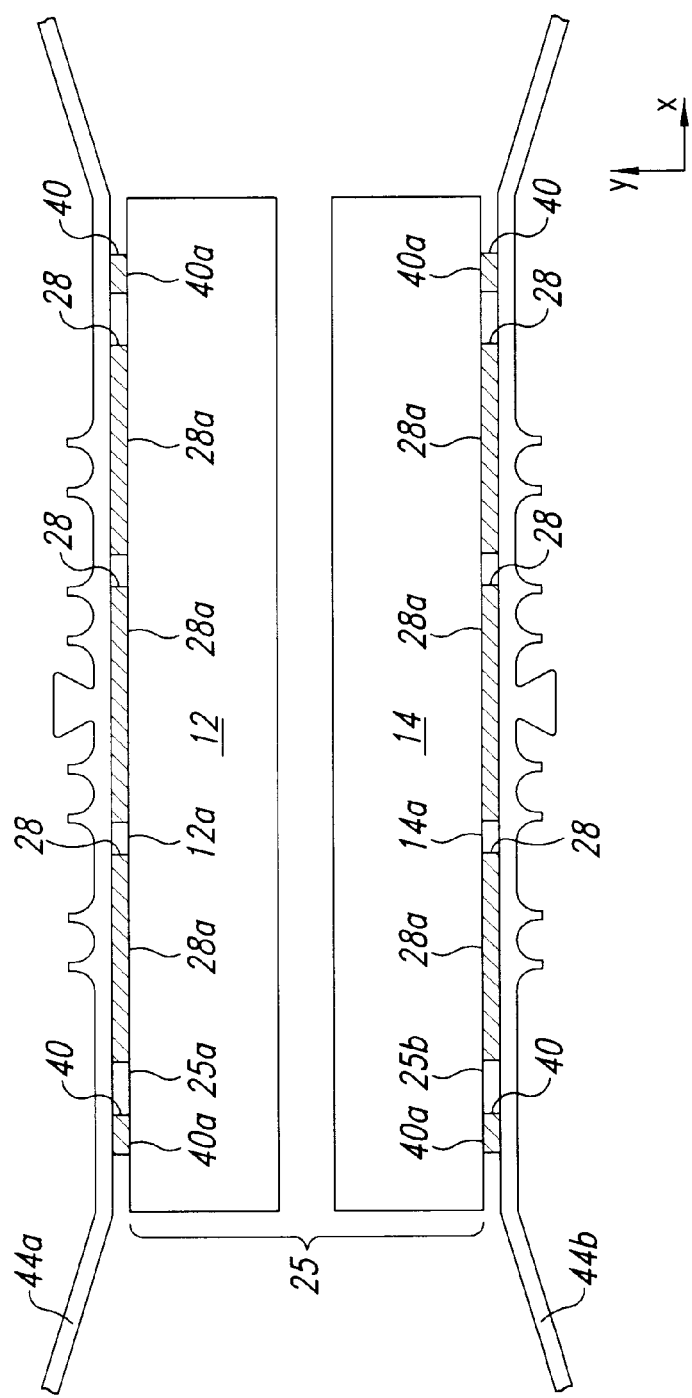
FIG. 16 is a transverse cross-sectional view of the electrode assembly of FIG. 8 taken substantially along the line 16—16 of FIGS. 15A and 15B showing flexing detail of the top and bottom walls of the housing.

If a conventional substantially rigid housing were used, the third position shown in FIG. 13 would be the final position the housing would assume when making contact with components such as electrodes. However, in the present invention, the housing 44 is sufficiently flexible to allow for continued relaxation of the housing onto the electrode assembly 25. As shown in FIG. 14, the top and bottom walls 44a and 44b of the housing 44 are flexible enough to further move inward as they relax sufficiently to make contact with the top and bottom external surfaces 25a and 25b of the electrode assembly 25 along substantially the entire width of the electrode assembly along the transverse x-axis. FIG. 16 is a more detailed cross-sectional view taken substantially along the line 16—16 of FIGS. 15A and 15B showing the extent of contact between the interior surfaces of the top and bottom walls 44a and 44b of the housing 44 with the top and bottom external surfaces 25a and 25b of the electrode assembly 25. As shown in FIG. 16, the top and bottom walls 44a and 44b of the housing 44 are flexible enough to contact the external surfaces 28a of the thermal strips 28 and the external surfaces 40a of the ceramic pills 40, but yet are inflexible enough to prevent the interior surfaces of the top and bottom walls of the housing from contacting the outer wall surfaces 12a and 14a of the first and second electrodes 12 and 14.

In the depicted embodiment, the top and bottom walls 44a and 44b of the housing 44 are flexible enough to resiliently flex at least 0.010 inches in the direction of the y-axis per linear inch distance in the direction of the x-axis for the configuration of the electrode assembly 25. This degree of flexibility is much greater than that of conventional housings, which typically are only flexible enough to resiliently flex 0.001 inches in the direction of the y-axis per linear inch distance in the direction of the x-axis. Other embodiments can use less flexible top and bottom walls 44a and 44b of the housing 44 depending upon the configuration of the electrode assembly 25. For instance, the top and bottom walls 44a and 44b of the electrode assembly 25 in some embodiments only need to resiliently flex at least 0.005 inches in the direction of the y-axis per linear inch distance in the direction of the x-axis, whereas for other embodiments the top and bottom walls of the housing only need to flex at least 0.002 inches in the direction of the y-axis per linear inch distance in the direction of the x-axis. To prevent the top and bottom walls 44a and 44b of the housing 44 from contacting the outer wall surfaces 12a and 14a of the first and second electrodes 12 and 14, the top and bottom walls of the housing are designed not to resiliently flex more than 0.030 inches in the direction of the y-axis per linear inch distance in the direction of the x-axis.

The uniformity of contact between the electrode assembly 25 and the housing 44 is dependent upon the thickness of the top and bottom walls 44a and 44b and the extent of the inward bow of the top and bottom housing walls when in the unflexed position. For instance, if the thickness of the top and bottom housing walls 44a and 44b were too great, the top and bottom housing walls could either be permanently deformed when expanded into an outwardly flexed position, or not flexible enough to uniformly conform to the top and bottom external surfaces 25a and 25b of the electrode assembly 25 when released. On the other hand, practical limitations, such as manufacturing constraints and the need for sufficient structural rigidity to provide stability of the end caps 46 and optic assemblies 48 attached to the housing 44 require a certain minimum thickness of the top and bottom walls 44a and 44b. Structural analysis including finite element analysis of the housing 44 helps to determine wall thickness and the amount of bowing for the top and bottom walls 44a and 44b.

For any given configuration there will be a tolerance range in which the thickness and the amount of bow of the top and bottom walls 44a and 44b of the housing 44 will be acceptable. If the top and bottom walls 44a and 44b are not flexible enough due to having a poor combination of amount of thickness and amount of bow, the top and bottom housing walls would not uniformly contact the top and bottom external surfaces 25a and 25b of the electrode assembly 25 upon placement of the electrode assembly within the housing 44. However, once the housing 44 has been sealed with the end caps 46 and optic assemblies 48 and a gas medium has been introduced, it is possible that the difference between the greater atmospheric pressure and the lesser gas medium pressure acting on opposite sides of the top and bottom walls 44a and 44b of the housing would be sufficient to further inwardly flex the top and bottom housing walls to uniformly contact the top and bottom external surfaces 25a and 25b of the electrode assembly.

Other combinations of the amount of thickness or bow of the top and bottom walls 44a and 44b of the housing 44 being out of tolerance may result in the electrode assembly 25 not being properly clamped by the housing and thereby being loose to move around within the housing. These situations would generally be difficult to remedy by relying only upon the difference between atmospheric and gas medium pressures. Generally, the embodiments rely primarily upon the amount of thickness and bow of the top and bottom walls 44a and 44b of the housing 44 for proper contact between the housing and the electrode assembly 25, rather than the difference in atmospheric pressure and the gas medium pressure on opposite sides of the top and bottom walls of the housing.

Figure 17:
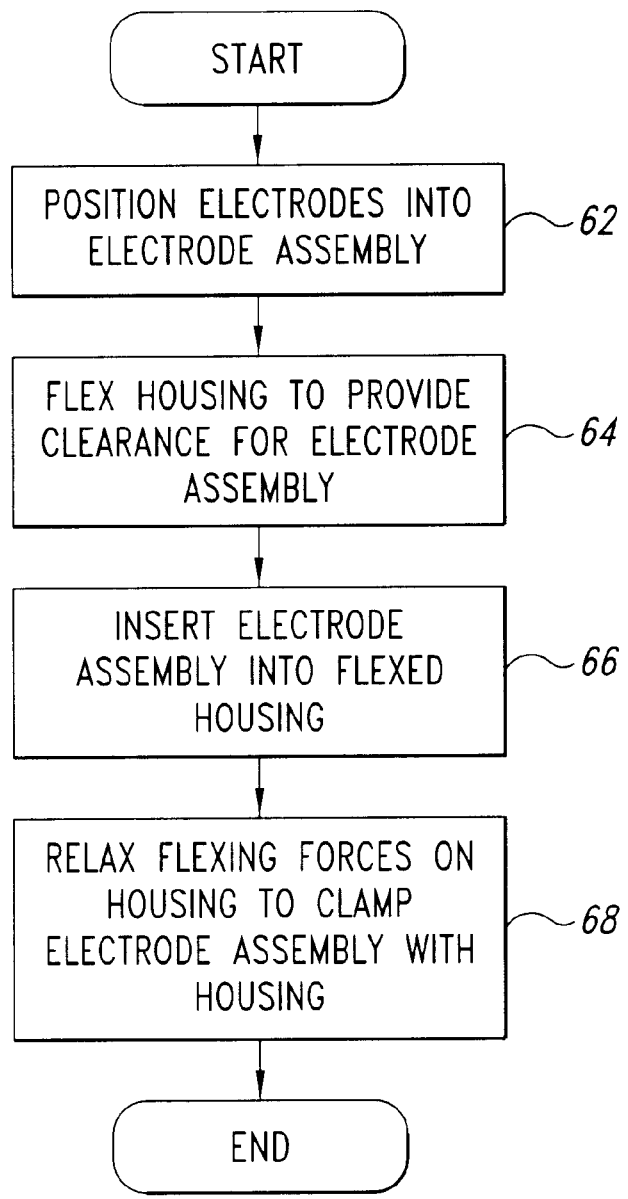
FIG. 17 is a flowchart of a procedure for assembly incorporating the present invention as applied to the slab laser of the FIG. 1.

Laser assembly aspects regarding the electrode assembly 25 and the housing 44 are summarized by the assembly procedure shown in the flow chart of FIG. 17. As part of this assembly procedure, the first and second electrodes 12 and 14 are correctly positioned to form a proper inter-electrode gap between the first and second electrodes with the spacers 30 (step 62). Number, thickness, and position of these spacers 30 will depend upon the particular shape of the inter-electrode gap that is desired. The first and second electrodes 12 and 14 are secured with bolts 32 through ceramic bushings 38 into the threaded apertures 37 as part of forming the electrode assembly 25. In addition, as part of assembling the electrode assembly 25, the thermal strips 28 are placed in the depressions 26 and the ceramic pills 40 are placed in the recesses 41. Pre-assembly of the electrode assembly 25 before insertion into the housing 44 helps to maintain consistent quality in such things as inter-electrode gap and the electric field associated with the discharge area of the resonator cavity 20, which in turn helps to enhance and maintain quality in laser performance. Pre-assembly of the electrode assembly 25 also helps to reduce any detrimental effects of anomalies in construction of the housing 44 so that consistency and quality of laser performance is further enhanced and fewer if any assembly steps are necessary to compensate for such anomalies.

Once the electrode assembly 25 is fully assembled, the top and bottom walls 44a and 44b of the housing 44 are flexed (step 64) to expand the housing, as discussed above, to provide sufficient clearance for insertion of the electrode assembly. The electrode assembly 25 is then placed and precisely positioned into the outwardly flexed housing 44 (step 66) with the use of precision tooling blocks. The top and bottom walls 44a and 44b are then released and allowed to relax back to a less flexed position to clamp the electrode assembly 25 within the housing 44 between the top and bottom walls 44a and 44b (step 68) after which the procedure ends. Since the housing 44 flexes to conform and clamp to the electrode assembly 25, tolerances in construction of the electrode assembly are less severe than tolerances involved with assembly of electrodes within housings found in conventional gas lasers. Also, contact can be more uniform between the housing 44 and the electrode assembly 25 than conventional electrodes and housings, so cooling efficiencies of the slab laser 10 can be more easily achieved or increased.

Additionally, uniform contact between the housing 44 and the electrode assembly 25 helps to maintain uniformity of capacitance between the housing and the electrode assembly, which further helps to maintain uniformity of the electric field generated within the discharge area of the resonator cavity 20. Unlike conventional methods, no further adjustment of the first and second electrodes 12 and 14 are required after the first and second electrodes arc inserted into the housing 44. This, among other things, simplifies assembly procedures and reduces the number and severity of assembly tolerances imposed by the assembly procedures compared with conventional methods resulting in savings in assembly cost and assembly time. After the housing 44 has clamped the electrode assembly 25, the end caps 46 and the optic assemblies 48 can then be welded onto or otherwise attached to the housing.

Once the end caps 46 and the optic assemblies 48 are attached to the housing 44, the housing 13 is evacuated and then a lasing, gas mixture is introduced into the housing at a pressure below atmospheric. In the depicted embodiment, the housing 44 has sufficient flexibility to flex under the differential pressure between the gas inside the housing and the external atmosphere and thereby cause the top and bottom walls 44a and 44b to further clamp the electrode assembly 25 to assure that the interior surfaces of the top and bottom housing walls are pressed into good contact with the thermal strips 28 of the first and second electrodes 12 and 14 for better thermal contact of the housing with the thermal strips to increase transfer of heat to the housing for improved cooling of the slab laser 10. The dimensions of the housing 44 and the electrode assembly 25, including the thermal strips 28, are selected to insure good thermal contact between the housing and the thermal strips of the first and second electrodes 12 and 14. Cooling of the electrode assembly 25 is partially accomplished via heat conduction through the gas mixture to the top and bottom walls 44a and 44b of the housing 44. This cooling is dramatically increased by the use of the thermal strips 28, or other suitable thermally conductive, but electrically insulating material, between each of the first and second electrodes 12 and 14 and the housing 44. Use of the thermal strips 28 removes a substantial portion of the gap between the first and second electrodes 12 and 14 and the housing 44 in which the gas resides. This gas gap has a significantly lower thermal conductivity than the thermal strips 28 and restricts cooling of he electrode assembly 25 by conduction. The use of the thermal strips 28 effectively eliminates a substantial portion of the gas gap and significantly improves the thermal conductivity between outer wall surfaces 12$a$ and 14$a$ of the first and second electrodes 12 and 14 and the housing 44. The thermal strips 28 contribute so significantly to cooling of the first and second electrodes 12 and 14 that cooling fluid need not be circulated through any type of interior chamber for the electrodes.

The number, thickness and surface size of the thermal strips 28, the type of dielectric or other material used for the thermal strips, and the location and spacing of the thermal strips are factors involved in optimizing the amount of heat conduction from the electrode assembly 25 to the housing 44 for cooling of the laser 10. In the depicted embodiment, the alumina ceramic chosen for the thermal strips 28 has a favorable mix of thermal conductivity for adequate conduction of heat away from the electrode assembly 25 and appropriate dielectric constant to control discharge breakdown of the lasing plasma. The thermal strips 28 of the present invention are to be distinguished from the prior art electrically insulating ceramic pills whose small size, typically on the order of 1% of the electrode surface area, is solely to electrically isolate electrodes from a housing. Although the thermal strips 28 are beneficial in cooling, other embodiments use other types of cooling mechanisms without using the thermal strips. Also, in other embodiments other types of electrically insulating materials and mechanisms are used in addition to or instead of the ceramic pills 40 to electrically isolate the first and second electrodes 12 and 14 from the housing 44.

The chosen alumina ceramic for the thermal strips 28 has an appropriate amount of flexure strength to avoid possible breakage during placement of the electrode assembly 25 into the housing 44. In the depicted embodiment, the 1 mm thickness of the thermal strips 28 is as thin as practicable without unreasonably increasing the risk of breakage during assembly or use. As noted above, the flexibility of the top and bottom walls 44$a$ and 44$b$ of the housing 44 combined with the pressure differential existing between the gas mixture inside of the housing and the atmosphere, insures that contact is established and maintained between the housing 44 and the thermal strips 28 in the depicted embodiment.

Use of the thermal strips 28 dramatically improves long-term performance and power stability of lasers, and in particular, air cooled lasers. For instance, experiments indicate a direct correlation between the amount of ceramic used for the thermal strips 28 and improvement in steady state output power level of a laser. For the depicted embodiment, the addition of 1 mm thick alumina ceramic thermal strips 28 with a collective surface size equivalent to 30% of the surface area of the outer wall surfaces 12$a$ and 14$a$ of the first and second electrodes 12 and 14 shows an improvement of the steady state output power of the slab laser 10 by a factor of two or more with a decrease in the thermal resistance by nearly two orders of magnitude. A top profile of the electrode assembly 25 shown in FIGS. 15A and 15B best illustrates the layout of the thermal strips 28 and the ceramic pills 40 used in the depicted embodiment with the first electrode 12 shown in FIG. 15A and the second electrode 14 shown in FIG. 15B.

For the embodiment of the first electrode 12 depicted in FIG. 15A and the second electrode depicted in FIG. 15B, the thermal strips are 0.520 inches wide and 3.020 inches long. The depressions 26 into the outer wall surfaces 12$a$ and 14$a$ of the first and second electrodes 12 and 14 are 0.025 inches deep. The thermal strips are 0.040 inches thick so they extend 0.015 inches past the outer wall surfaces 12$a$ and 14$a$ of the first and second electrodes 12 and 14.

The thermal strips 28 are positioned a distance, K, of 0.945 inches along the transverse x-axis inward from the longitudinal edges, 12$a1$ and 14$a1$, of the first and second electrodes 12 and 14. The thermal strips 28 are spaced apart from each other a distance, L, of 0.125 inches along the transverse x-axis and a distance, M, of 0.105 inches along the longitudinal z-axis except for a distance, N, of 0.50 inches along the longitudinal z-axis at the longitudinal center, O, of the first and second electrodes 12 and 14 as shown in FIGS. 15A and 15B.

The ceramic pills 40 are 0.25 inches in diameter. The centers of one set of ceramic pills 40 are spaced a distance, P, of 2.917 inches along the longitudinal z-axis from the longitudinal center, O, and the centers of another set of ceramic pills 40 are spaced a distance, Q, of 8.750 inches along the longitudinal z-axis from the longitudinal center, O. The centers of the ceramic pills 40 are spaced inward from the longitudinal edges 12$a1$ and 14$a1$ of the first and second electrodes a distance, R, of 0.350 inches.

Another consequence is that the equilibrium operating temperature of the first and second electrodes 12 and 14 is reduced from 95° C. to 45° C. Coverage up to 100% of the surface area of the outer wall surfaces 12$a$ and 14$a$ of the first and second electrodes 12 and 14 is used in alternative embodiments, however, some configurations of lasers require less than 100% surface area coverage to maximize heat transfer from the first and second electrodes 12 and 14.

In other embodiments, coverage of at least 5% of the surface area of the outer wall surfaces 12$a$ and 14$a$ of the first and second electrodes 12 and 14 increases the steady state stable output power of the slab laser 10 by approximately 20%, which is a minimum heat transfer effect to justify the heat transfer system. Other embodiments utilize a surface area coverage of 15% or more resulting in over a 50% gain in steady state stable output power, which is a more commercially desirable result.

Using alumina ceramic in the depicted embodiment for the thermal strips 28 also increases electrical capacitance between the electrode assembly 25 and the housing 44. This increase in capacitance in turn reduces the unlit gas to lit gas discharge frequency shift, which makes the discharge of the lasing medium easier to initiate. The additional capacitance increases the quality factor ratio of electrical energy that can be stored versus that amount of electrical energy that is dissipated with respect to the physics involved with the electrode assembly 25. This increase in the quality factor ratio in turn results in a larger voltage across the first and second electrodes 12 and 14, and consequently, easier ignition of the discharge.

Modeling of the discharge physics involved with the depicted embodiment indicates that the 30% coverage of the outer wall surfaces 12$a$ and 14$a$ of the first and second electrodes 12 and 14 with the 1 mm thick alumina ceramic increases the capacitance between the electrode assembly 25 and the housing 44 by 68% with a corresponding reduction in unlit to lit resonance frequency shift by 38%, which makes the plasma discharge significantly easier to initiate. Similar modeling indicates that a 100% coverage of the outer wall surfaces 12a and 14a of the first and second electrodes 12 and 14 with 1 mm thick alumina ceramic increases the capacitance between the electrode assembly 25 and the housing 44 by 227% with a reduction in frequency shift of 66%.

From the advantages gained by 100% coverage, one may conclude that this would be an ideal solution for cooling. There are, however, diminishing returns in adding more thermal strips 28 beyond the point at which the thermal conductivity is sufficient to accomplish adequate removal of heat from the first and second electrodes 12 and 14, and consequently, adequate removal of heat from the plasma to provide acceptable laser performance. There is a point at which the amount of capacitance between the electrode assembly 25 and the housing 44 becomes too much and starts to significantly distort the electric field and voltage distribution between the first and second electrodes 12 and 14 over the entire length of the electrodes. It is generally agreed that optimum laser performance is achieved if the longitudinal voltage non-uniformity between the first and second electrodes 12 and 14 is less than about 5 to 10%. Transmission line modeling suggests that the inclusion of up to 30% alumina ceramic, as found in the depicted embodiment, will still satisfy this voltage uniformity criterion. For the depicted embodiment, 30% coverage of alumina ceramic provides sufficient cooling to maintain the desired performance of the slab laser 10.

For the depicted embodiment, the plasma discharge is electrically excited by a radio frequency generator of the power supply 21 applied via a matching network directly to the first and second electrodes 12 and 14. The RF frequency generator of the power supply 21 operates at a frequency of 40.68 MHz with an output power level of at least 1 kW, but other embodiments operate at other frequencies and power levels. The generator of the power supply 21 is connected to the first and second electrodes 12 and 14 in a biphase fashion such that the phase of the voltage on one electrode is shifted substantially 180 degrees relative to the voltage on the other electrode to achieve a biphase excitation. This phase shift is accomplished by placement of inductors 42 between the first and second electrodes 12 and 14 as shown in FIG. 8.

Other embodiments use higher coverage by the thermal strips 28 and use of thermal material in other shapes with higher coverage of the first and second electrodes than the 30% coverage by the alumina ceramic thermal strips of the depicted embodiment. For these embodiments using higher coverage levels, inductors 52 are placed between each of the first and second electrodes 12 and 14 and the housing 44 as illustrated in FIG. 10. Coverage values as high as 100% of the outer wall surfaces 12a and 14a of the first and second electrodes 12 and 14 are used in alternative embodiments; however, sufficient inductance values are used for the inductors 52 to balance the capacitance introduced by the use of the additional thermal material to maintain uniformity of the voltage and electric field between the first and second electrodes 12 and 14.

As shown in FIG. 10, the housing 44 can be formed with grooves 50 on the outward side of its top and bottom walls 44a and 44b of the housing to receive cooling tubes (not shown), to accommodate operation of the slab laser 10 at high power levels. The housing 44 can also have cooling fins or other forms of heat sinks to assist in removing heat from the housing and other appendages including mounting brackets.

From the foregoing it will be appreciated that, although specific embodiments of the invention have been described herein for the purposes of illustration, various modifications may be made without deviating from the spirit and scope of the invention. Accordingly, the invention is not limited except as by the appended claims.

It is claimed:

1. A laser comprising:
    a housing having a first interior surface and an opposing second interior surface;
    an electrode assembly comprising:
        first and second electrodes each having an interior surface and an exterior surface;
        linkage members configured to link the first and second electrodes together independent of the housing;
        first and second electrical insulation material positioned adjacent to and extending outward of the exterior surface of the first and second electrodes, respectively; and
        third electrical insulation material being positioned between the first and second electrodes to separate the interior surfaces of the first and second electrodes from one another to form an inter-electrode gap; and
    the housing being resiliently flexed to produce inwardly directed force against the electrode assembly, the first and second interior surfaces of the housing being in contact with and transmitting force against the first and second electrical insulation material, whereby the inwardly directed force is transmitted to the electrode assembly to keep the electrode assembly in a fixed position within the housing without the need of additional fasteners.

2. The laser of claim 1 wherein the linkage members comprise threaded bolts and ceramic bushings.

3. The laser of claim 1, further comprising end caps and optic assemblies being fastened to opposing ends of the housing to produce a vacuum container to contain a gas medium.

4. The laser of claim 1 wherein the first and second electrodes each have more than one section arranged to define more than one discharge area having longitudinal axes that are other than parallel.

5. The laser of claim 1 wherein portions of the exterior surfaces of the first and second electrodes are coated with the first and second electrical insulation material, respectively.

6. The laser of claim 1 wherein the first, second, and third electrically insulating material are selected from one or more of the following: alumina, beryllia, boron nitride, aluminum nitride, mica, and polyimide.

7. The laser of claim 1 wherein the first and second interior surfaces of the housing are configured to be bow shaped when in an unflexed position.

8. The laser of claim 1 wherein the first and second insulation material is bonded directly to the exterior surfaces of the first and second electrodes, respectively, by one of the following: flame, plasma spraying, and anodizing.

9. A laser comprising:
    a housing having a first interior surface and an opposing second interior surface;
    an electrode assembly comprising:
        a first side having one or more first exterior surfaces in a first common plane;
        a second side having one or more second exterior surfaces in a second common plane; and
        first and second electrodes each having an interior surfaces the first and second electrodes being spaced apart so that the interior surfaces of the first and second electrodes form an inter-electrode gap; and the housing being resiliently flexed sufficiently so that the first and second interior surfaces of the housing contact substantially all the first and second exterior surfaces, respectively, of the electrode assembly to produce inwardly directed force against the first and second sides of the electrode assembly, whereby the inwardly directed force is transmitted to the electrode assembly to keep the electrode assembly in a fixed position within the housing without the need of additional fasteners.

10. The laser of claim 9 wherein first and second interior surfaces of the housing are configured to be bow shaped when in an unflexed position.

11. The laser of claim 9, further comprising end caps and optic assemblies that are affixed to opposing ends of the housing by one of the following: welding, soldering, epoxying, gluing, bolting, and screwing.

12. The laser of claim 9 wherein the first and second electrodes each have more than one section with more than one discharge area.

13. The laser of claim 9 wherein the interior surfaces of the first and second electrodes are other than parallel with one another.

14. The laser of claim 9, wherein the first interior surface of the housing is configured to flex from an unflexed position to a first expanded position at least 0.002 inches in a first direction per inch of a second direction to expand the housing when a first force is applied thereto in the first direction, the second direction being transverse to the first direction.

15. The laser of claim 14 wherein the first interior surface of the housing is configured to flex from an unflexed position to a first expanded position at least 0.010 inches in the first direction per inch of the second direction.

16. A method for constructing a laser, the method comprising:
applying a force to one or more walls of a housing having an opening to resiliently flex the one or more walls from an unflexed position at least 0.005 inches in a first direction per linear inch in a second direction to a flexed positions the second direction being transverse to the first direction;
inserting components comprising first and second electrodes into the housing through the opening when the one or more walls of the housing are in the flexed position; and
removing the applied force to the one or more walls of the housing to allow the one or more walls of the housing to operatively contact the first and second electrodes while flexing at least 0.002 inches in the first linear direction per linear inch in the second direction, whereby the inwardly directed force is transmitted to the electrode assembly to keep the electrode assembly in a fixed position within the housing without the need of additional fasteners.

17. A method for constructing a laser, the method comprising:
assembling an electrode assembly having exterior surfaces spaced apart a first distance and first and second electrodes, the first and second electrodes linked together, positioned opposing one another and spaced to produce a desired inter-electrode gap between the first and second electrodes;
applying a force to one or more walls of a housing having an opening to flex the one or more walls to enlarge the opening of the housing from a first opening width having dimensions less than the first distance to a second opening width having dimensions greater that the first distance;
inserting the electrode assembly into the opening of the housing when the one or more walls are flexed to the second opening width; and
removing the applied force to the one or more walls of the housing to allow the one or more walls of the housing to move into engagement with and apply inwardly directed force to one or more of the exterior surfaces of the electrode assembly, whereby the inwardly directed force is transmitted to the electrode assembly to keep the electrode assembly in a fixed position within the housing without the need of additional fasteners.

18. The method of claim 17, further comprising attaching an end cap and optic assemblies to the opening of the housing.

19. The method of claim 17 wherein the inwardly directed force is partially due to atmospheric forces upon exterior surfaces of the housing.

* * * * *

UNITED STATES PATENT AND TRADEMARK OFFICE
CERTIFICATE OF CORRECTION

PATENT NO. : 6,195,379 B1
DATED : February 27, 2001
INVENTOR(S) : Benjamin K. Jones et al.

It is certified that error appears in the above-identified patent and that said Letters Patent is hereby corrected as shown below:

Claim 9, column 14,
Lines 64 and 65, "interior surfaces the" should read -- interior surface, the --.

Claim 16, column 15,
Line 39, "flexed positions the" should read -- flexed position, the --.

Signed and Sealed this

Second Day of October, 2001

Attest:

NICHOLAS P. GODICI
*Attesting Officer*     *Acting Director of the United States Patent and Trademark Office*